O. A. HOLLIS.
DIFFERENTIAL GEAR.
APPLICATION FILED SEPT. 1, 1914.
1,262,049.
Patented Apr. 9, 1918.
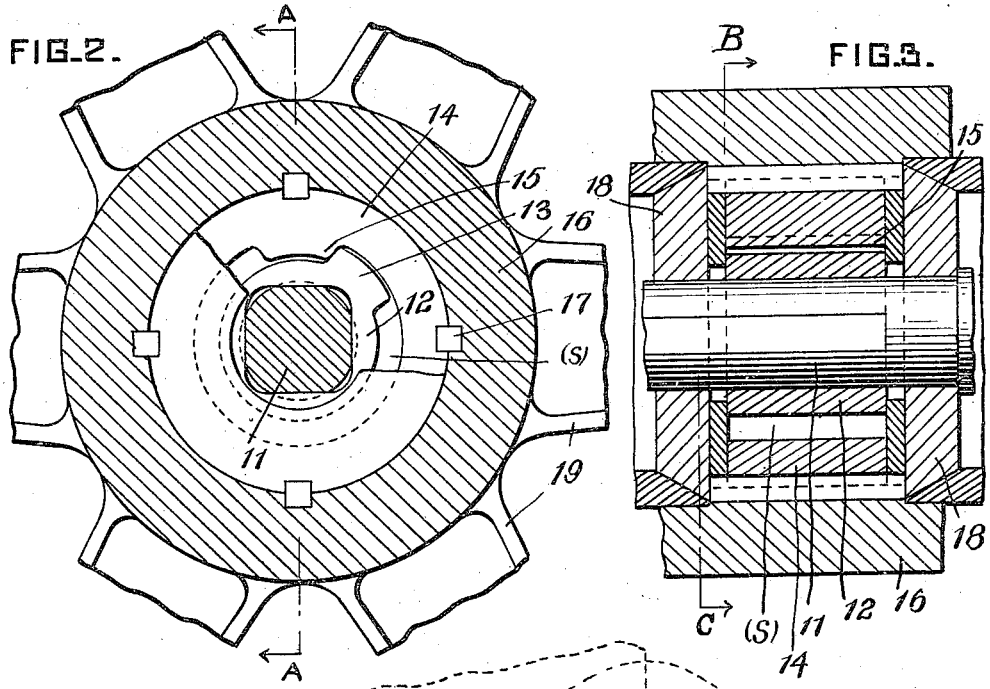
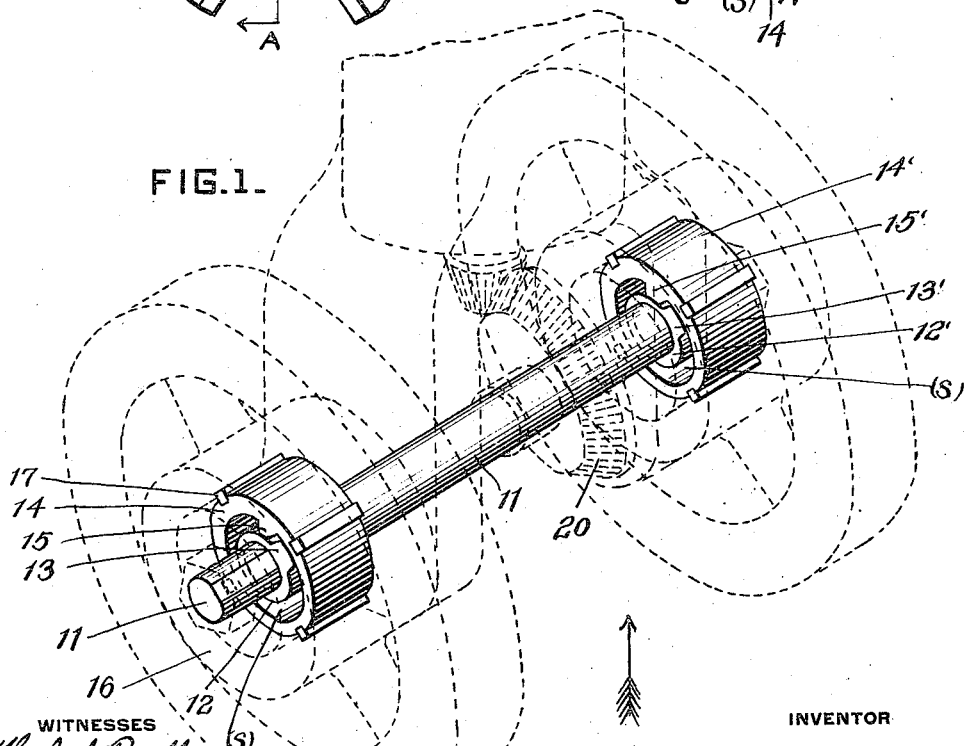

UNITED STATES PATENT OFFICE.

OTIS A. HOLLIS, OF PITTSBURGH, PENNSYLVANIA, ASSIGNOR TO HOLLIS AUTOMATIC TRACTION JACK COMPANY, OF PITTSBURGH, PENNSYLVANIA, A CORPORATION OF DELAWARE.

DIFFERENTIAL GEAR.

1,262,049.

Specification of Letters Patent.   Patented Apr. 9, 1918.

Application filed September 1, 1914.   Serial No. 859,630.

*To all whom it may concern:*

Be it known that I, OTIS A. HOLLIS, a citizen of the United States, residing at Pittsburgh, in the State of Pennsylvania, have invented a certain new and useful Differential Gear, of which the following is a specification.

My invention relates to the means of rotating vehicle wheels by a driven axle, and my particular object is to furnish a limited differential for driving axles whereby in making a turn the inner wheel normally carries the entire load of driving, the outer wheel running free, without any modification of the application of power to the unitary axle.

Referring to the drawings, Figure I shows a perspective of an axle with the two driving wheels thereon, such parts being in the relative positions assumed when the vehicle is turned to bring the driving axle into the turning position shown; Fig. II shows a partial vertical cross-section through the axle and a wheel hub thereon; and Fig. III shows a longitudinal vertical section through the parts of Fig. II on the line A, A, of that figure, Fig. II being a section on the line B, C, of Fig. III.

In the present construction of power driven vehicles it is customary to place a differential gearing at the middle point of the driven axle and at this point to apply the power. The axle is divided in the middle and a wheel is attached to each part thereof. By means of the differential gearing the power is applied to the two driven wheels independently, so that they may rotate at different speeds. Thus when the vehicle is making a turn, the outer wheel will rotate faster than the wheel on the inside of the curve. However, there is a serious disadvantage to this form of gearing. If one of the wheels slip, by reason of soft ground, or other failure to grip, that wheel will be rotated rapidly, and practically all of the power will be transmitted through the spinning wheel, without an effective force being applied through the gripping wheel to move the load. My construction avoids this difficulty, because the wheels are attached to a unitary axle, and they both must turn in the direction of rotation of the axle. If the inner wheel slips, the axle engages the outer wheel and drives that one. Thus, on the axle 11 are fixed collars 12, 12', upon which are studs 13, 13' respectively. Boxings 14, 14' are mounted in the hub and surrounding axle over the collar 12. The interior of the boxings are cut away from the collars except for portions which extend toward the center of the axle, forming trip studs 15, 15', which are adapted to engage the studs 13, 13'. The hub 16 of any suitable wheel is attached to the boxing 14 by means of splines 17. The form of hub 16, its bearing 18, and spokes 19, and of the wheel as a whole, is immaterial.

The operation of my device is as follows. Power may be applied to the axle 11 at any suitable point, preferably at its center, as by gearing 20. The studs 13, 13', rotate counterclockwise until they engage the studs 15, 15', as indicated at the left of Fig. I. Thereafter the rotation of the axle is transmitted to the wheels and both are driven counterclockwise to propel the vehicle forward.

When a turn is to be made, the wheel on the outside, making the larger circle, will be propelled by the swinging of the outer end of the axle, and not by the rotation thereof. That is, the outer wheel must rotate faster than the axle itself rotates, and the studs will disengage, as shown at the right of Fig. I, and the outer wheel will run ahead of the locking position. The entire load of driving will be taken up by the inner wheel.

In this way I am enabled to use a unitary axle, without complicated differential gears, and yet there is no danger of sliding the outer wheel. Many other advantages of my device will readily occur to those familiar with the art.

For example, by neutralizing the driving axle 11, by reversing it until the lugs 13 are out of engagement, the pair of wheels may be turned in place, in either direction, with perfect freedom. This may be done by hand, if desired, rotating the supporting column, as described in my prior application No. 701268, filed June 3, 1912. This ability to turn the steering wheels in any direction without use of the power, of course, enables a turn in place of the whole vehicle, without any friction, all the wheels simply rotating idly on their axles.

Having thus described my invention, what I claim is the following:

The combination of a driven axle having bearings at each end, a single lug at each end fixed on the axle, a wheel on each bearing, and a single lug on each wheel adapted to be engaged by the lug on the axle at one point in either direction of rotation.

In testimony whereof I have hereunto signed my name in the presence of the subscribed witnesses.

OTIS A. HOLLIS.

Witnesses:
 FRED'K STAUB,
 W. A. HECKMAN.

Copies of this patent may be obtained for five cents each, by addressing the "Commissioner of Patents, Washington, D. C."